(12) United States Patent
Ida

(10) Patent No.: US 6,276,477 B1
(45) Date of Patent: *Aug. 21, 2001

(54) COMPONENT CAR SYSTEM

(75) Inventor: Robert Ida, Jackson, NJ (US)

(73) Assignee: Ida Automotive, Morganville, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/238,776

(22) Filed: Jan. 27, 1999

(51) Int. Cl.[7] .................................................. B62D 25/00
(52) U.S. Cl. ........................... 180/89.1; 280/785; 296/197
(58) Field of Search ........................ 180/89.1; 296/193, 296/196, 195, 194, 197, 35.3; 280/781, 785, 792; D12/86, 91, 196

(56) References Cited

U.S. PATENT DOCUMENTS

| | | | |
|---|---|---|---|
| D. 154,192 | * | 6/1949 | Tucker .................................. D12/91 |
| D. 293,311 | | 12/1987 | Strosek ................................ D12/196 |
| D. 321,679 | | 11/1991 | Shimoda ............................. D12/196 |
| D. 389,095 | | 1/1998 | Stollery ................................ D12/91 |
| 2,128,930 | * | 9/1938 | Fageol et al. ........................ 180/291 |
| 2,988,397 | * | 6/1961 | Brueder ................................ 296/196 |
| 3,542,147 | | 11/1970 | Shakespear ............................ 180/64 |
| 3,694,890 | | 10/1972 | Arning et al. ........................... 29/428 |
| 3,843,189 | | 10/1974 | Duff et al. ............................ 296/1 R |
| 3,856,323 | | 12/1974 | Arning et al. ................... 280/96.2 R |
| 3,958,653 | | 5/1976 | Arning et al. ......................... 180/157 |
| 4,014,587 | | 3/1977 | Eggert, Jr. ........................... 296/28 F |
| 4,027,421 | | 6/1977 | Allen ....................................... 46/17 |
| 4,422,685 | | 12/1983 | Bonfilio et al. ....................... 296/197 |
| 4,462,632 | * | 7/1984 | Grassl, Sr. ............................ 296/187 |
| 4,676,545 | | 6/1987 | Bonfilio et al. ....................... 296/197 |
| 4,682,809 | | 7/1987 | Huss ................................... 296/31 P |
| 4,842,326 | * | 6/1989 | DiVito ................................. 296/196 |
| 4,881,756 | * | 11/1989 | Kumasaka et al. .................. 280/785 |
| 4,978,164 | * | 12/1990 | Nakamura et al. ................... 296/197 |
| 5,005,864 | * | 4/1991 | Chachere ............................. 280/800 |
| 5,020,848 | | 6/1991 | Raj ........................................ 296/210 |
| 5,090,105 | | 2/1992 | DeRees .................................. 29/469 |
| 5,308,115 | * | 5/1994 | Ruehl et al. ......................... 280/785 |
| 5,634,663 | * | 6/1997 | Krupp et al. ........................ 280/800 |
| 5,924,764 | * | 7/1999 | Eipper et al. ........................ 296/189 |

* cited by examiner

Primary Examiner—J. J. Swann
Assistant Examiner—David R. Dunn
(74) Attorney, Agent, or Firm—Mathews, Collins, Shepherd & Gould, P.A.

(57) ABSTRACT

The present invention relates in general to a component car system and method for making the same and more particularly to a novel system of car components adapted to enable persons to build a new car having the appearance of a classic or antique car such as a "Tucker".

17 Claims, 7 Drawing Sheets

COMPONENT CAR SYSTEM

BACKGROUND AND SUMMARY OF THE INVENTION

The present invention relates in general to a component car system and method for making the same and more particularly to a novel system of car components adapted to enable persons to build a new car having the appearance of a classic or antique car such as a "Tucker".

The method of making automobiles has evolved over the years from the practice of crafting motor vehicles one at a time to assembly in a piecemeal fashion in an assembly line manned by human operators whereby the various chassis components such as parts of the suspension system, steering system, driveline elements and the engine were added to the vehicle-frame as it progressed from station to station to the present practice of preassembling subassemblies incorporating portions of the body and frame that are attached to other portions of the frame. In spite of the ever-increasing variety of automobiles currently available due in large part to the aforementioned increased efficiency of the production process, a significant portion of the population retains an interest in antique, vintage, rare and/or unusual automobiles which are only available to the general public in limited quantities. Typically such automobiles are inaccessible for the average vintage automobile aficionado due to the exorbitant cost or are unavailable because of scarcity. In addition, many of these automobiles were not well constructed as originals, due to poor materials, engineering and/or workmanship. As a result, even a collector fortunate enough to own an "original" antique or vintage car can not operate the vehicle on the road because of safety concerns and/or for fear of damaging the original parts. In such cases the original parts of the automobile are inevitably replaced with replica or stock parts. However, retrofitting such vehicles with new parts is typically difficult and costly, often requiring custom fitting or fabrication of each part with no guarantee that the replacement parts will render the vehicle roadworthy or provide an acceptable degree of aesthetic appeal.

In an effort to increase the general availability and accessibility of vintage automobiles, automobile "kits" have been provided which consist of nothing more than a series of prefabricated panels that are intended to be mounted by a purchaser onto an existing stock chassis to replicate the appearance of a particular automobile. Such kits generally provide poor imitation shells of the automobiles which they are intended to replicate and when assembled on a stock chassis do not provide an automobile well-suited for operation on the street. The alternative to kit cars is for an enthusiast to custom build a desired vintage car from scratch. The cost of such a venture is prohibitive.

Therefore, for the vintage car enthusiast who wishes to build his or her own car, a need exists for a component car consisting of modular body components which can be shipped to and subsequently assembled by the enthusiast without the need for reengineering the vehicle or contracting to have the vehicle built from the ground up.

Many classic automobiles have been the subject of kits, including for example the Auburn, Cord, and Ford Cobra. However, it is heretofore unknown to remanufacture a classic car known as the "Tucker Torpedo", also known as the "Tucker 48" according to the apparatus and method disclosed herein. Only fifty "Tuckers" were ever produced, making it one of the rarest of production automobiles. One effort to produce a car having the outward appearance of the "Tucker" was undertaken for the purpose of providing a prop for a movie dramatizing the life of the manufacturer of the "Tucker". However, the automobile resulting from that effort was merely an ordinary stock chassis having a body shell in the shape of the "Tucker". The body shell was not operable in that it was not able to be driven on the street, the windows did not work and the doors could not be opened.

Accordingly, it is a principal object of the present invention to provide an assembly of modular components which provide a novel system for providing a replica automobile body which is better constructed than the original automobile upon which it is based.

It is a further object of the present invention to provide a component car body capable of housing all of the refinements of a modern automobile yet having the appearance of a vintage automobile.

It is still another object of the present invention to provide a component system which when assembled provides a replica of the body of the "Tucker Torpedo" or "Tucker 48".

It is still further an object of the present invention to provide a component system consisting of modular body components capable of being shipped to a customer and assembled by the customer.

It is yet another object of the present invention to provide a method for assembling the components of the present component car system.

These and other objects of the invention will become clear from an inspection of the detailed description of the invention and from the appended claims.

SUMMARY OF THE INVENTION

A novel component car system has been developed which has a chassis and a plurality of body components mountable on said chassis or to one another to form the body of the car. The chassis is provided with a plurality of mounting means for supporting said body components and for further supporting front and rear axles, a steering suspension, at least one engine and the remaining parts required to provide an automobile capable of being operated on any of the nation's highways. The chassis consists substantially of a central frame member having a front frame member extending therefrom at one end and a rear frame member extending therefrom at the other end. Each of the frame members is preferably substantially rectangular in shape. Each of the frame members has a plurality of mounting means disposed thereon. The modular body components consist substantially of a rear end section comprising a rear trunk box integral with right and left rear fenders forming the right and left rear sides and the rear of the car and rear wheel wells and further comprising air induction cutouts and at least one grille receiving opening, a trunk cover, a pair of front doors and a pair of rear doors, a cab section comprising a body, a floor, door openings for receiving said doors, a firewall, wheel well inside walls and a bulkhead, a front end section comprising right and left front fenders forming the right and left front sides and front of the front end and front wheel wells and headlight apertures, a front trunk box, a front end support, a hood and wheel well covers or skirts. When assembled, the rear end section, cab section, and front trunk box are mounted directly on the chassis. The front trunk box is further securably attached to the firewall of the cab. The rear end section and the cab section are further attached to each other. The trunk cover is hingedly mounted to said rear end section. The front and back doors are each hingedly mounted on said cab section in the openings provided therefor. The front end section is secured to said front trunk box. The front end support is secured to the front of the front end section. The hood is hingedly attached to said front end section. The unique modular components are capable of being crated and shipped to a customer for later assembly. When assembled the component car has the outward appearance of a classic car such as the "Tucker Torpedo". The components of the present invention are uniquely constructed to facilitate shipping, assembly and ease of handling by a car enthusiast to enable the enthusiast to build his or her own classic automobile. In essence, a reassemblable automobile body is provided which when assembled provides an automobile body equivalent to or superior to the body of the original automobile. To this end, a unique system of flanges and/or attachment means integral with the modular body components facilitates attachment of the components to each other and to the chassis.

The component car system of the present invention may further include a front suspension system mountable on said chassis, a pair of air induction grilles and at least one rear grille. A glove box may be included in at least one door. The rear grille and air induction grilles are mounted in the respective openings provided therefor in said rear end section. A metal substructure may be provided for forming door pillars and other structural and/or reinforcing components. The component car system may further comprise front and rear windows and at least one engine mountable on either or both of the front or rear frame member. The system of the present invention provides a set of modular components which enables the average car enthusiast to construct a structurally sound frame and body for a vintage or classic car such as the "Tucker Torpedo" or "Tucker 48" which is superior in every way to the original automobile. It has been discovered that the component system of the present invention provides a structurally sound chassis and body for a replica classic car, said chassis and body being suitable for road use when equipped with a modern engine, suspension and accessories. The present invention also provides a novel method by which the components of the present system are assembled.

In one embodiment the component car system comprises an extended cab section and an extended chassis to provide a limousine-type vehicle having the appearance of a classic car such as the "Tucker".

In another embodiment the component car system further comprises a power source such as at least one combustion engine mounted on said chassis, an exhaust system, a brake system, a fuel tank and fuel system, a cooling system, an electrical system, a steering system and a plurality of gauges for monitoring various of said systems. In still another embodiment the component car system further comprises a plurality of window channels, a plurality of power window mechanisms, a plurality of door latch mechanisms, a plurality of door hinges, a plurality of windows, window rubber, a hood latch and striker, at least two front fender braces, a front bumper, at least three front grilles, at least three headlight assemblies with rings, a center headlight turning mechanism, at least two cooling ducts, a rear air exhaust grille, a rear bumper, a rear hood latch, at least two taillights preferably including bezels and lenses, at least four door handles, a hood emblem, at least one radiator, a steering column, a steering linkage kit, a brake pedal unit, a brake cylinder, an engine cover, at least two hood hinges, at least two trunk hinges, at least two trunk prop supports, at least one hood prop rod, at least four bumper brackets, at least one hood release, at least one trunk release and a steel inner structure. In still another embodiment the component system further comprises at least one exhaust system, an air conditioning, heating and defrosting unit, a windshield wiper kit, a brake line plumbing kit, at least one shifter cable, a gauge assembly, a gauge assembly bezel, at least one front seat, at least one rear seat, upholstery for the interior of the car, a steering wheel, a brake pedal pad, a gas pedal, a weatherstripping package preferably comprising rubber, a body wiring harness, an engine wiring harness and ECM (electronic control module) such as but not limited to a Northstar (registered trademark of General Motors Corp.) wiring harness and ECM, at least four wheels, preferably but not limited to steel wheels, at least four hubcaps, at least four tires, at least four seat belts and at least four inside door release mechanisms.

In one preferred embodiment, the engine is located in the rear of the vehicle and the radiator of the cooling system is also located in the rear of the vehicle and is cooled by air flowing through air ducts communicating with air induction cutouts formed on the rear fenders. In another embodiment the engine is mounted in the front of the vehicle. In yet another embodiment the component car system has both a rear-mounted and front-mounted engine.

DETAILED DESCRIPTION OF THE PREFERRED EMBODIMENTS

Figure 1:
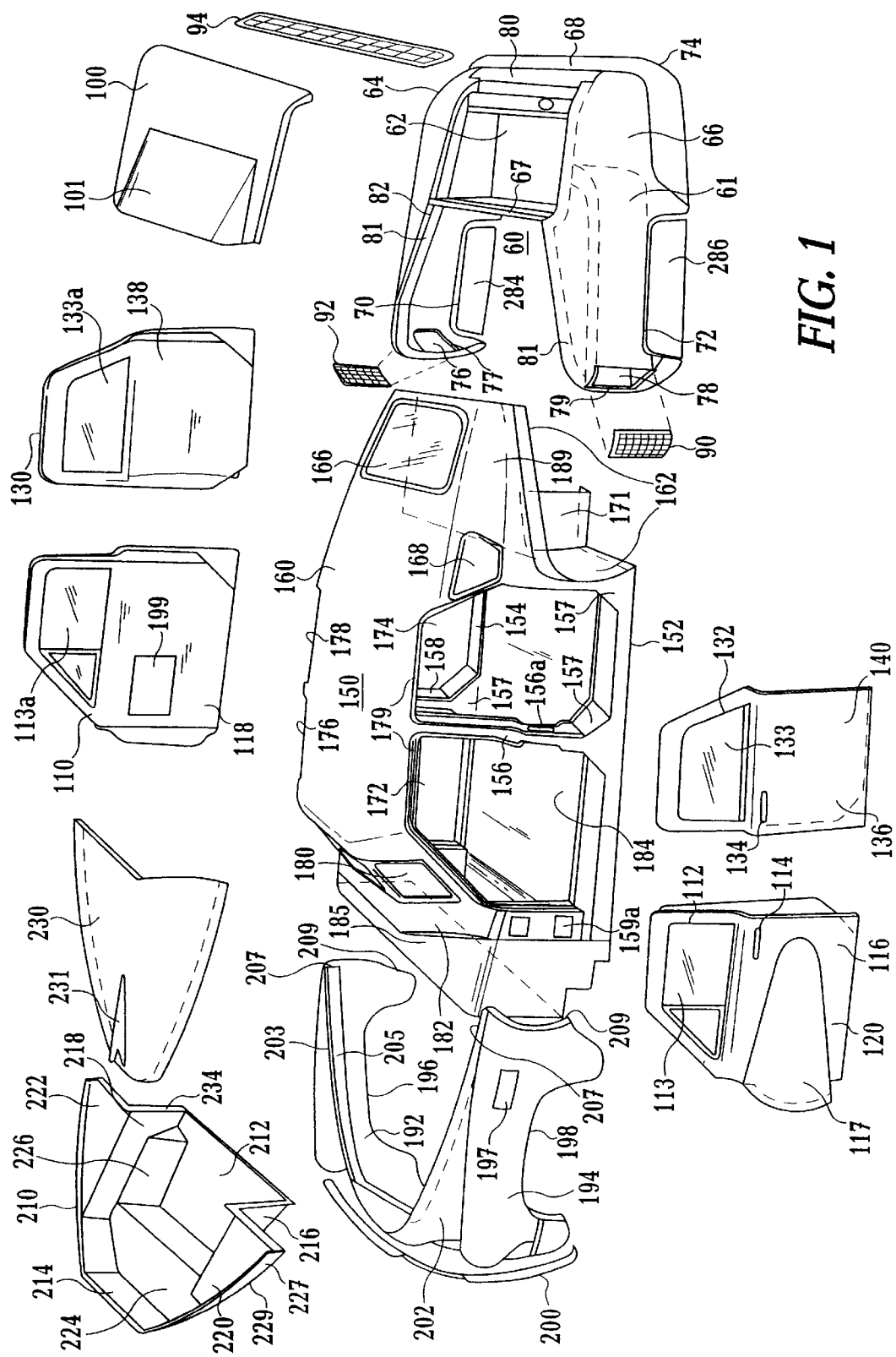
FIG. 1 is an exploded perspective view of the component car system according to this invention.
Figure 2:
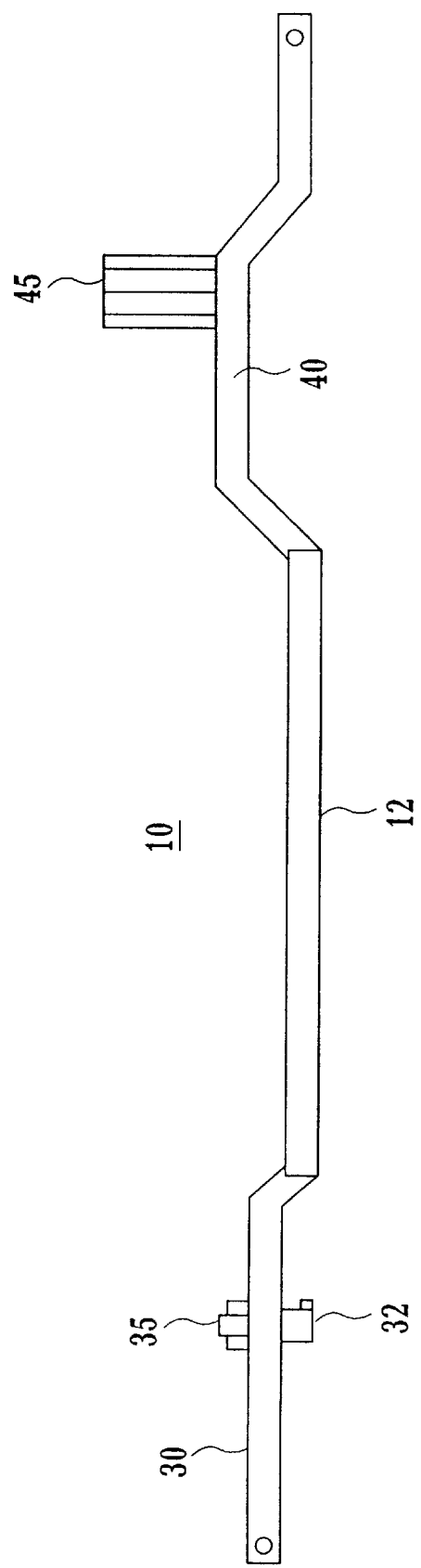
FIG. 2 is a side elevational view of the chassis of the present invention.
Figure 3:
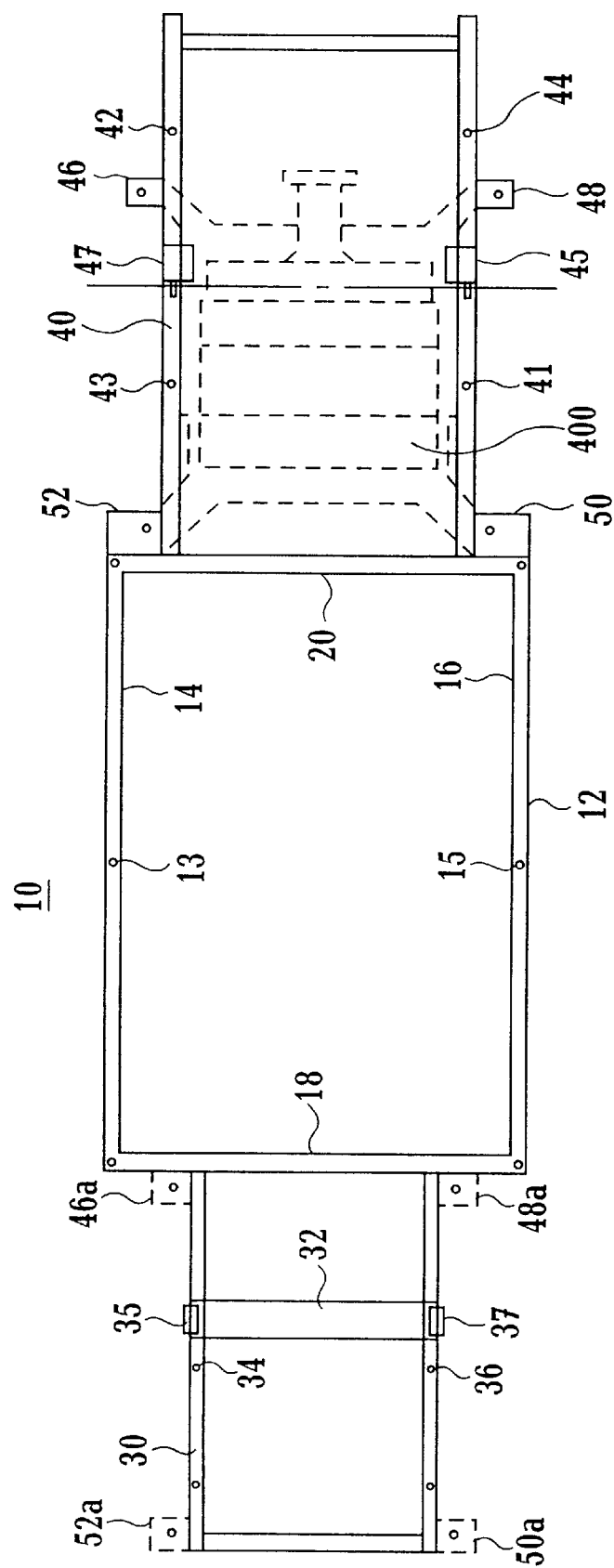
FIG. 3 is a top plan view of the chassis of FIG. 2.
Figure 5:
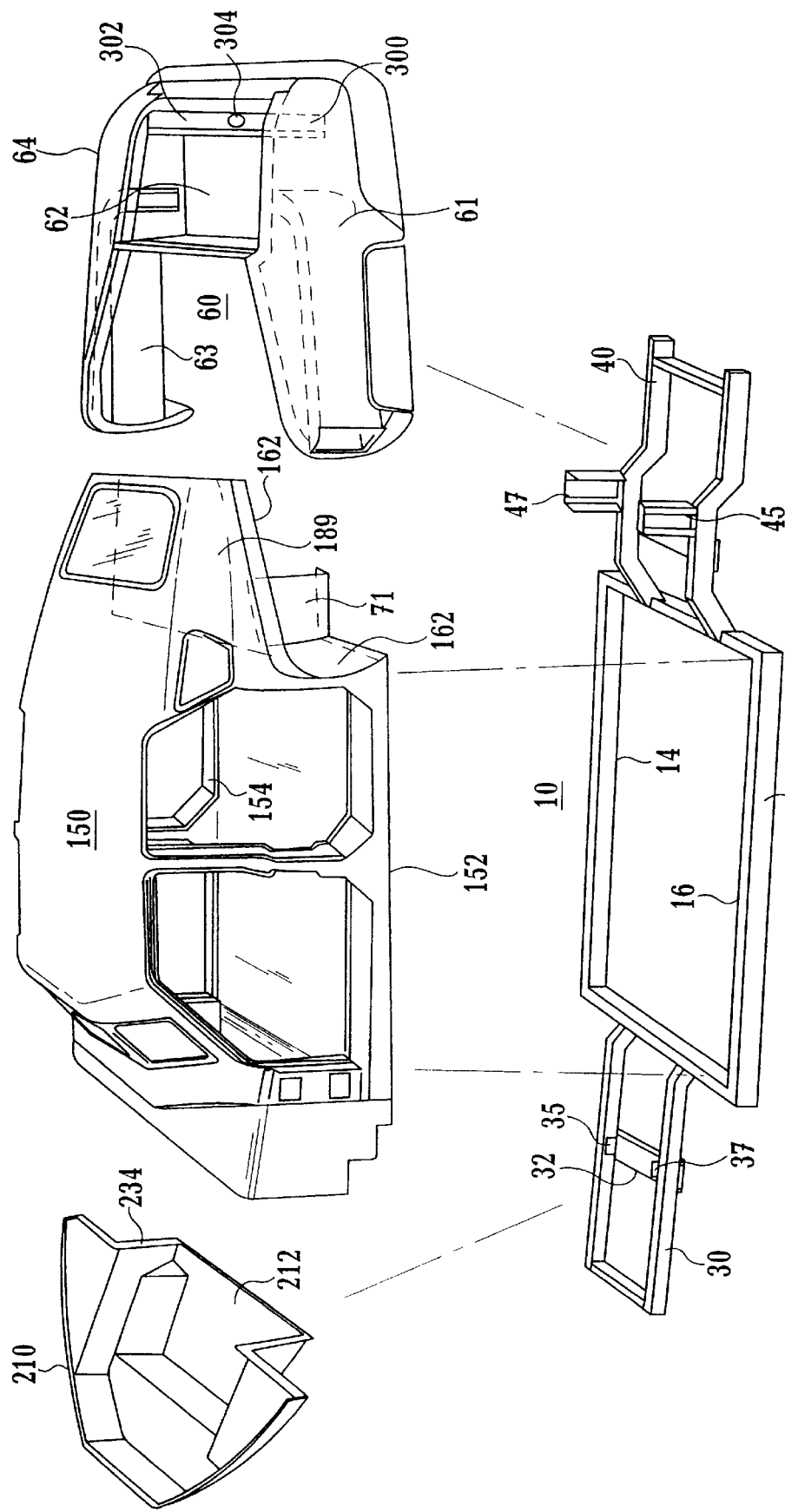
FIG. 5 is a side perspective view of the chassis and selected components of the present invention.

Referring to FIGS. 1 and 5 the invention comprises a chassis 10 and a plurality of body components mountable on said chassis 10 or to one another to form the body of the car. Referring now to FIGS. 2, 3 and 5 the chassis 10 consists substantially of a central rectangular frame member 12 having long sides 14 and 16 and a front end 18 and a back end 20. Chassis 10 further comprises a substantially rectangular front frame member 30 extending from said front end 18 and a substantially rectangular rear frame member 40 extending from said back end 20. Central frame member 12 further comprises at least two mounting means 13 and 15. Said mounting means may comprise pre-drilled holes for receiving mounting bolts at various locations on said central frame member 12. Front frame member 30 further comprises at least one cross member 32, and at least two mounting means 34 and 36 and strut supports 35 and 37. Rear frame member 40 further comprises at least two mounting means 42,and 44, flanges 46, 48, 50 and 52 for mounting an engine such as engine package 400 and strut supports 45 and 47. Front frame member 30 may optionally include flanges 46a, 48a, 50a and 52a for mounting an engine.

When it is desired that the present invention include a front-mounted engine, front frame member 30 is of the same or substantially the same construction as rear frame member 40 as shown in FIGS. 2 and 3. Mounting means 34 and 36 may comprise any known mounting means including but not limited to apertures through which bolts may be passed for securing tolerance plates and may further include bracket members.

Referring now to FIGS. 1 and 5, the present invention further comprises a plurality of body components mountable on said chassis 10. Some of the components are mountable directly onto said chassis 10 while others are mountable to components already mounted on said chassis 10. The body components consist substantially of a rear end section 60, a trunk cover 100, a right front door 110, a left front door 120, a right rear door 130, a left rear door 140, a cab section 150, a front end section 190, a front trunk box 210, hood 230 and wheel skirts or wheel well covers 284 and 286.

Rear end section 60 further comprises a rear trunk box 62 formed therein, a right rear fender 64 and left rear fender 66 which form the right and left rear sides of the rear end section 60 and meet to form the rear 68 of the rear end section 60. Wheel wells 70 and 72 are formed in said fenders 64 and 66. Air induction cutouts 76 and 78 are formed on said fenders 64 and 66 respectively. Air induction cutouts 76 and 78 may comprise an opening of any shape or size and may be grilled or open. A grille receiving opening 80 is disposed on said rear 68 above a bumper 74 which may be separate or integrally formed in said opening 80. Flange 81 is formed along the interior edge 82 of rear end section 60, said interior edge 82 formed on three sides by fenders 64 and 66 and the top of rear trunk box front wall 67 for mounting to rear end receiving section 162. Flange 81 in a preferred embodiment depends downwardly from interior edge 82 along fenders 64 and 66 and extends outwardly in a horizontal plane from the interior edge proximal the top of rear trunk box front wall 67. Trunk box 62 may further comprise additional structural elements for securing accessories and/or systems necessary for operation of the component car such as but not limited to means for retaining a cooling system.

In a preferred embodiment, rear end section 60 further comprises bumper 74 and a plurality of grilles such as but not limited to a pair of air induction grilles 90 and 92 and a rear grille 94. In a preferred embodiment air induction grilles 90 and 92 are shaped to be received in air induction cutouts 78 and 76. Air induction cutouts 76 and 78 further comprise recessed interior flanges 77 and 79 against which grilles 92 and 90 are securably positionable. Grilles 92 and 90 may be permanently secured in cutouts 76 and 78 by any suitable means including but not limited to adhesives, screws, bolts, etc. Rear grille 94 is shaped to be received in grill receiving opening 80 and may be permanently secured therein by any suitable means.

Now referring to FIG. 1 and FIG. 5 in a most preferred embodiment rear end section 60 further comprises air ducts 61 and 63 built into rear fender sections 60 and 64 for conveying air to rear trunk box 62.

Trunk cover 100 further comprises a latch means of known construction (not shown) and hinges of known construction (not shown). Trunk cover 100 is hingedly attached to said rear end section 60 at rear trunk box front wall 67.

Figure 4:
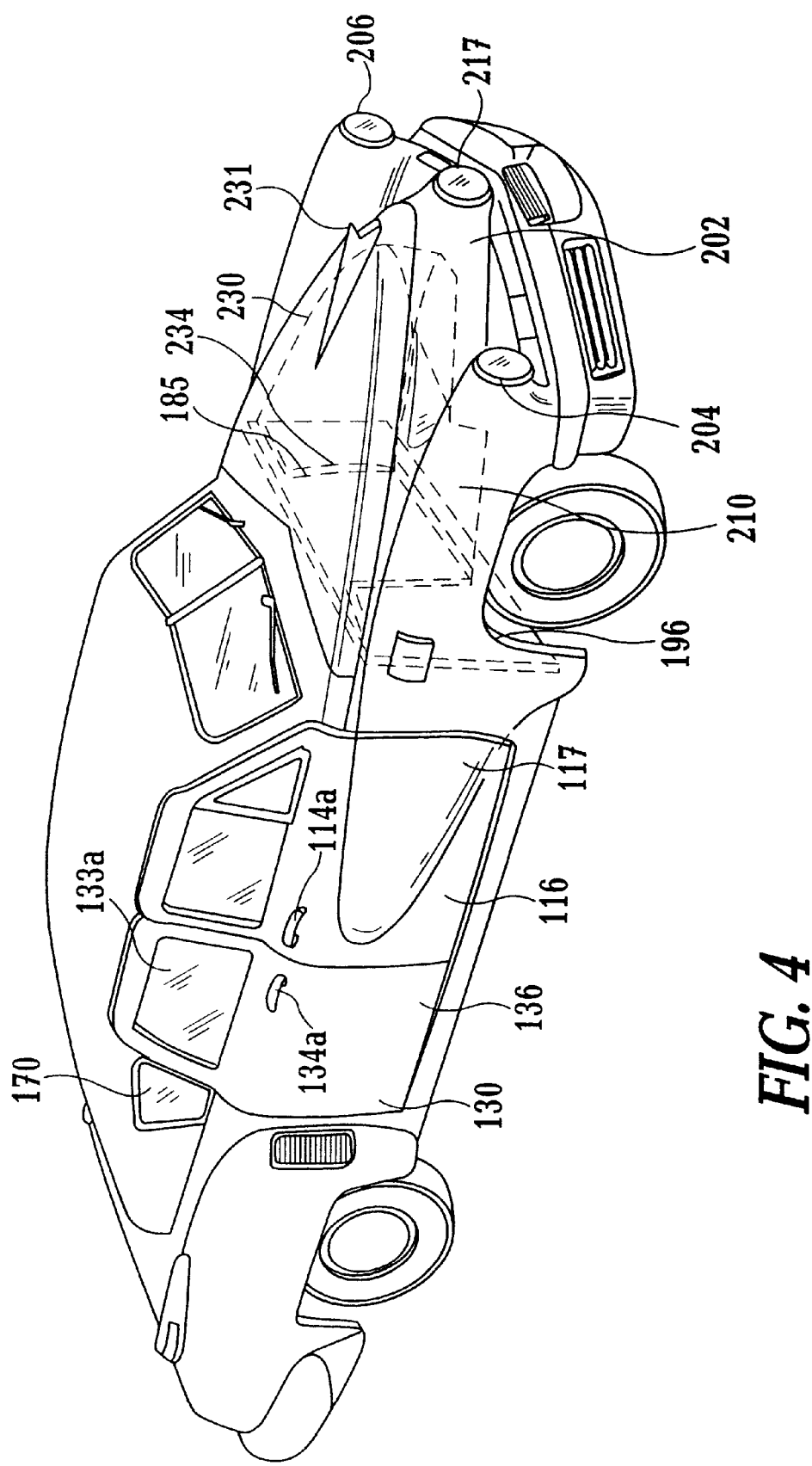
FIG. 4 is a front perspective view of a preferred embodiment of the component car system according to this invention.

Now referring to FIGS. 1, 4 and 5, cab 150 comprises longitudinal support members 152 and 154, pillars 156 and 158, roof 160, rear end section receiving surface 162, rear window opening 166, opera window openings 168 and 170, door openings 172, 174, 176 and 178 defined substantially by pillars 156 and 158, roof 160 and longitudinal support members 152 and 154, windshield opening 180, bulkhead 182, a floor 184, a firewall 185, a pair of wheel well inside walls 171 and a dashboard (not shown). In an alternative embodiment (not shown), a metal substructure formed within said cab 150 such as but not limited to a roll bar may be provided for reinforcing door pillars 156 and 158 of said cab 150. The metal substructure may also be provided for forming other structural components such as but not limited to a dashboard, steering column support and firewall. In a preferred embodiment pillars 156 and 158 have recesses formed therein for receiving striker plates 156a. Cab 150 further comprises hinge mounting pads 159a for mounting hinges for the front doors 120 and 110 (not shown). Door openings 172, 174, 176 and 178 each further comprise an interior flange 179 oriented along the perimeter and in the plane of the respective door openings for adding rigidity to the cab 150 and for receiving weatherstripping to prevent leakage. Reinforced bases 157 are located at the base of pillars 156 and 158 and in the door openings 174 and 178 proximal the rear end section receiving surface 162 to further reinforce said door openings.

Now referring to FIGS. 1 and 4, floor 184 is formed between longitudinal support members 152 and 154 and firewall 185 and follows the contour of the cab frame proximal the rear end section receiving surface 162 to form a rear floor 189. Rear end section receiving surface 162 preferably comprises a flange which accommodates fastening means for securably attaching flange 81 of rear end section 80 to cab 150.

Now referring to FIGS. 1 and 4 front doors 110 and 120 are typically identical except that they are mirror images of each other. Each of the front doors 110 and 120 comprises window frame 112, outer surface 116 and inner surface 118. Front doors 110 and 120 are hingedly attached to cab 150 and in the closed position are received in door openings 176 and 172, respectively. In a preferred embodiment front doors 110 and 120 further comprise windows 113a and 113 respectively, handles 114a and 114 respectively, at least one door latch (not shown), respectively and a glove box 199.

Rear doors 130 and 140 are typically identical except that they are mirror images of each other. Each of the rear doors 130 and 140 comprises window frame 132, an outer surface 136 and inner surface 138. Rear doors are hingedly attached to cab 150 and in the closed position are received in door openings 178 and 174, respectively. In a preferred embodiment rear doors 130 and 140 further comprise windows 133a and 133 respectively, handles 134a and 134 respectively, and at least one door latch (not shown), respectively.

Front end section 190 comprises right front fender 192 and left front fender 194, which form wheel wells 196 and 198, respectively, front end support 200, front fairing 202 and headlight openings. In a preferred embodiment the front end section 190 further comprises headlights 204 and 206. Front fairing 202 defines an interior edge 203 which is complementary in shape to hood 230. Interior flange 205 extends from interior edge 203. In a preferred embodiment front end support 200 is provided and attachable to front end section 190. In another preferred embodiment front fairing 202 further comprises a headlight 217 disposed on its front end. In a most preferred embodiment the headlight 217 is steerable. Hood 230 may further comprise hood ornament 231.

Now referring to FIG. 1 front trunk box 210 comprises a bottom 212, front side 214, sides 216 and 218 and flange 234. Front box 210 may further comprise additional sides and/or structural elements such as but not limited to support surfaces 220 and 222 and wheel well accommodation elements 226. Front trunk box 210 may further comprise means for securing accessories and/or systems necessary for operation of the component car such as but not limited to means for retaining a cooling system, a brake cylinder, a fuel tank, a battery and the like.

Now referring to FIGS. 1 and 5, rear end section 60 is mountable directly on chassis 10. Trunk box 62 mounts directly onto rear frame member 40. Now also referring to FIG. 3, in one embodiment, holes are drilled in the bottom of trunk box 62 to match mounting means 41, 42, 43 and 44 where said mounting means are apertures for receiving fasteners such as but not limited to bolts. A lesser or greater number of mounting means may be used for mounting rear end section 60 depending on the mounting means employed.

Now referring to FIGS. 3 and 5, cab section 150 is mountable directly onto chassis 10. A plurality of mounting means disposed on long sides 14 and 16 of central frame member 12 are provided. Longitudinal support members 152 and 154 are mountable directly on said long sides 16 and 14 of central frame member 12. In one embodiment, holes are drilled in said longitudinal support members 152 and 154 for communicating with said plurality of mounting means disposed on said long sides 16 and 14, said mounting means comprising apertures for receiving fasteners such as but not limited to bolts. Cab section 150 is further mountable directly to rear end section 60. In a preferred embodiment flange 81 of rear end section 60 is fastened to rear end receiving surface 162 wherein said receiving surface 162 is a flange complementary in shape and orientation to flange 81. Preferably the horizontal portion of flange 81 is received under the rear floor 189 of cab 150 and securably attached thereto. Flange 81 of rear end section 60 is fastened to rear end receiving surface 162 by employing any known fastening means such as but not limited to glue, bolts, screws and the like or a combination thereof.

Front trunk box 210 is mountable directly onto chassis 10. A plurality of mounting means disposed on front frame member 30 are provided. In one embodiment, holes are drilled in front trunk box bottom 212 to match mounting means 34 and 36 wherein said mounting means are apertures for receiving fasteners such as but not limited to bolts. Front trunk box 210 is further securably attached to the firewall 185 of the cab 150 by fastening flange 234 to said firewall by any known fastening means such as but not limited to bolts and the like.

Figure 6:
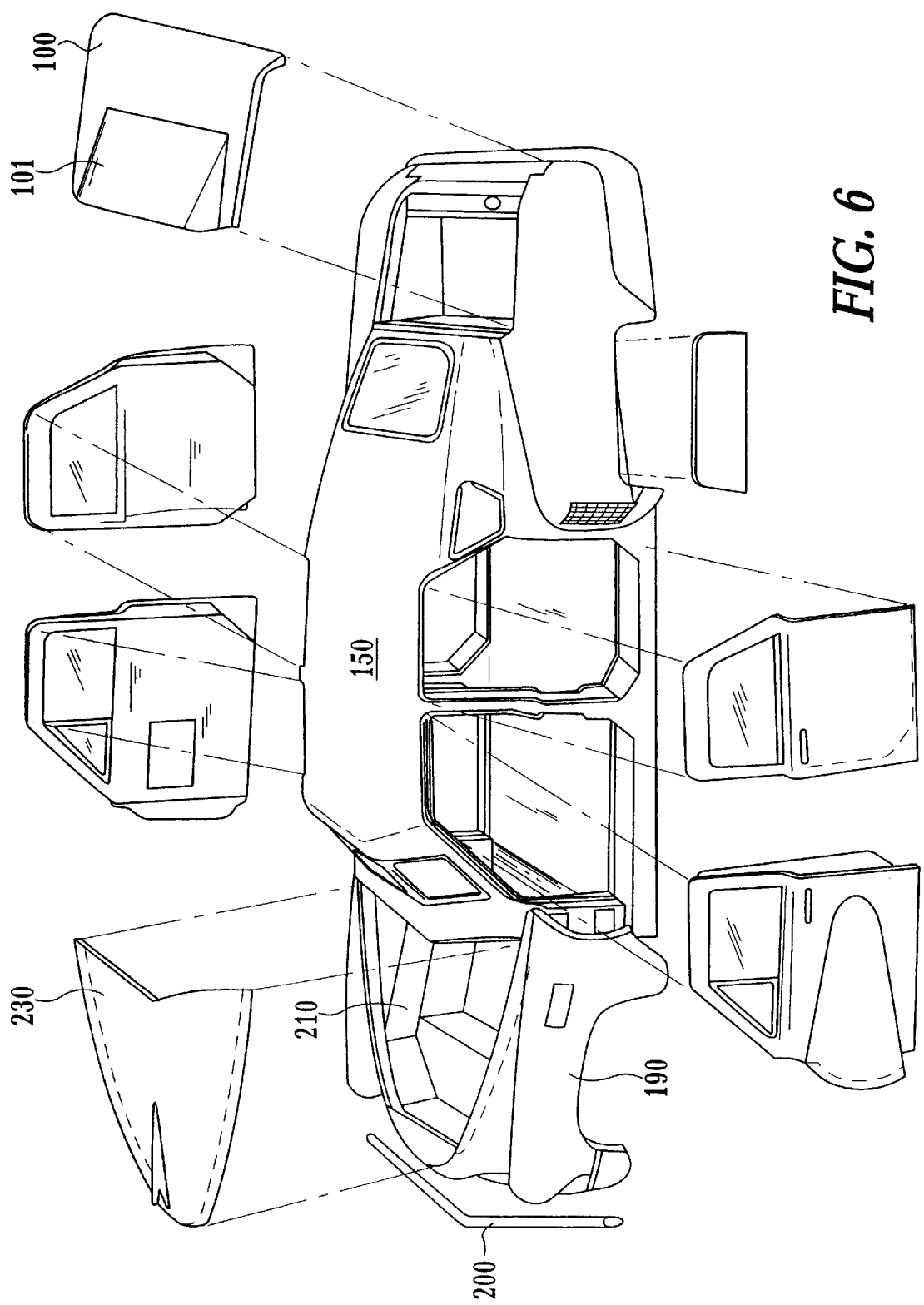
FIG. 6 is a side perspective view of the present invention in a partially assembled condition.

Now referring to FIGS. 1 and 6, front end section 190 is mountable on front trunk box 210 and cab 150. In a preferred embodiment front end section 190 comprises interior edge 203 and interior flange 205 extending therefrom and front trunk box 210 comprises a mating edge 227 and flange 229 extending therefrom said edge 227 and flange 229 extending around and forming the outside perimeter of front trunk box 210. Edge 203 and flange 205 are complementary in size and shape to edge 227 and flange 229 and are mountable thereto by any suitable mounting means such as but not limited to adhesive, bolting and the like. In a preferred embodiment front end section 190 further comprises mounting surfaces 207 and 209 which mount to cab 150 and may be secured by any suitable securing means such as but not limited to adhesive, bolts, screws or a combination thereof and the like.

Now referring to FIGS. 1 and 6, hood 230 is hingedly attached to cab 150. In the closed position, hood 230 is received in the space formed by edge 203 on fairing 202. Hood 230 is maintained in a closed position by any suitable means known in the art such as but not limited to a hood latch.

Wheel well skirts 284 and 286 are releasably or permanently attachable to wheel wells 70 and 72, respectively by any means known in the art including but not limited to latching, bolting and the like.

Accessories such as but not limited to headlights, gauges, windshield wipers, taillights, power windows, a hood ornament and the like are contemplated to be added to the present component system by a purchaser of the component system. Alternatively, such accessories may be included as part of the component system. In one embodiment, the doors 110, 120, 130 and 140 further comprise power window motor assemblies (not shown) and front doors 110 and 120 comprise a fender extension contour 117 disposed thereon, trunk cover 100 further comprises ornamental roof extension 101 and front end section comprises three grilles formed therein to convey the appearance of a "Tucker Torpedo" or "Tucker 48". In another embodiment as shown in FIG. 3, the component system of the present invention further comprises a suspension system (not shown) mountable on mounts 35 and 37 of chassis 10. In yet another embodiment as shown in FIG. 3, the component system further comprises engine package 400 mountable on mounts 46, 48, 50 and 52 of chassis 10. In still another embodiment, chassis 10 further comprises mounting means 46a, 48a, 50a and 52a for accommodating a second engine package in the front end of the car. In yet another embodiment the floor 184 may comprise a transmission tunnel (not shown) for accommodating a transmission. In another embodiment a fuel tank (not shown) is provided for mounting in front trunk box 210 and fuel tank filling door 197 is disposed on front fender 192 or 194. Alternatively, the fuel tank may be disposed under a back seat (not shown) or under the front trunk box 210 behind the front end support 200.

Now referring to FIG. 5, in a preferred embodiment the component system further comprises an engine cooling system comprising ducts 61 and 63 formed inside rear fenders 66 and 64 respectively and a radiator 300 provided in trunk box 62. Radiator 300 is secured in trunk box 62 near grille receiving opening 80 such that radiator 300 fits securely under flange 302 and access to a radiator cap is provided by opening 304 formed in flange 302. In an alternate embodiment radiator 300 may be disposed behind front end support 200 and be connected by tubing to the engine package 400.

Figure 7:
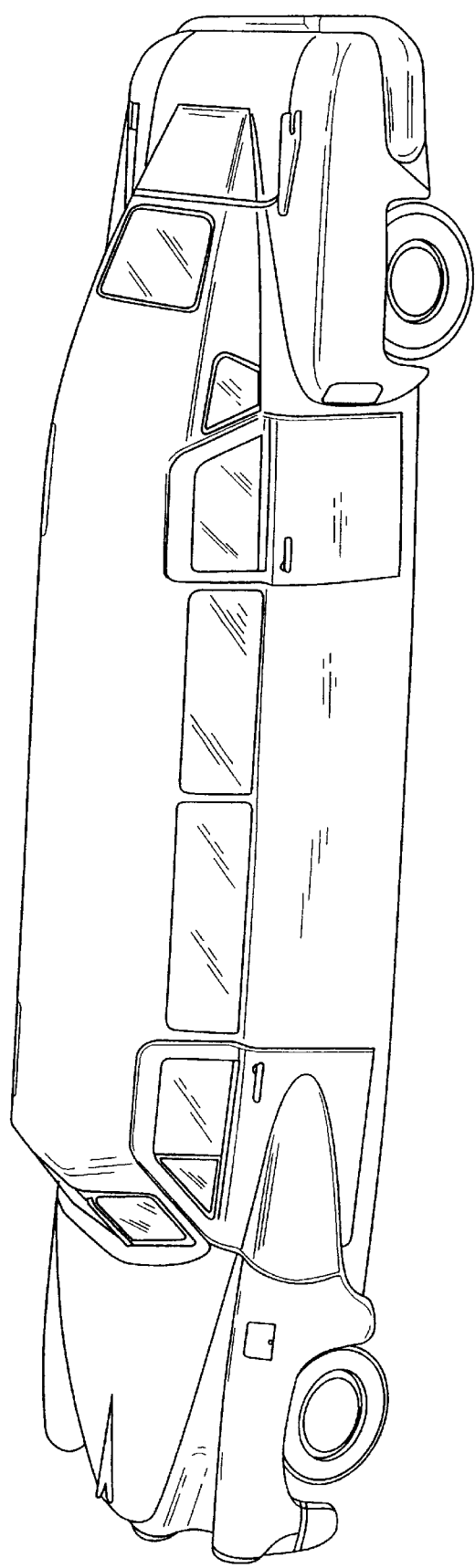
FIG. 7 is a top perspective view of a preferred embodiment of the present invention.

Now referring to FIGS. 3 and 7, in still another preferred embodiment longitudinal support members 152 and 154 and long sides 14 and 16 of central frame 12 are lengthened and pillars 156 and 158 are widened to provide a component system for a limousine.

In yet another embodiment (not shown), the component system comprises a cab having openings for receiving only two doors, thereby providing a two-door vehicle rather than a four-door vehicle.

The components comprising the plurality of body panels of the present invention may be formed of any suitable material including but not limited to molded plastic, fiberglass, reinforced fiberglass, epoxy resin, sheet metal and the like. In a preferred embodiment the body panels are formed of fiberglass by a plug molding process.

In a preferred embodiment the present component system is fabricated in such a way that the following components must be assembled in substantially the following order: 1) rear end section 60 is mounted to chassis 10; 2) cab section 150 is mounted to chassis 10 and further secured to rear end section 60; 3) front trunk box 210 is mounted to chassis 10; and 4) front end section 190 is mounted to front trunk box 210 and further secured to cab 150. The remaining components may be assembled in any order.

In a most preferred embodiment the component car system of the present invention comprises a plurality of body panels which when assembled provide an automobile body having the appearance of a Tucker "Torpedo" or "Tucker 48".

In another most preferred embodiment the component car system further comprises a power source such as at least one combustion engine 400 mounted on said chassis, an exhaust system, a brake system, a fuel tank and fuel system, a cooling system, an electrical system, a steering system and a plurality of gauges for monitoring various of said systems. In still another embodiment the component car system further comprises a plurality of window channels, a plurality of power window mechanisms, a plurality of door latch mechanisms, a plurality of door hinges, a plurality of windows, window rubber, a hood latch and striker, at least two front fender braces, a front bumper, at least three front grilles, at least three headlight assemblies with rings, a center headlight turning mechanism, at least two cooling ducts, a rear air exhaust grille, a rear bumper, a rear hood latch, at least two taillights preferably including bezels and lenses, at least four door handles, a hood emblem, at least one radiator, a steering column, a steering linkage kit, a brake pedal unit, a brake cylinder, an engine cover, at least two hood hinges, at least two trunk hinges, at least two trunk prop supports, at least one hood prop rod, at least four bumper brackets, at least one hood release, at least one trunk release and a steel inner structure. In still another embodiment the component system further comprises at least one exhaust system, an air conditioning, heating and defrosting unit, a windshield wiper kit, a brake line plumbing kit, at least one shifter cable, a gauge assembly, a gauge assembly bezel, at least one front seat, at least one rear seat, upholstery for the interior of the car, a steering wheel, a brake pedal pad, a gas pedal, a weatherstripping package preferably comprising rubber, a body wiring harness, an engine wiring harness and ECM (electronic control module) such as but not limited to a Northstar (registered trademark of General Motors Corp.) wiring harness and ECM, at least four wheels, preferably but not limited to steel wheels, at least four hubcaps, at least four tires, at least four seat belts and at least four inside door release mechanisms.

While the invention has been described in connection with what is presently considered to be the most practical and preferred embodiments, it is understood that the invention is not to be limited to the disclosed embodiment, but on the contrary, is intended to cover various modifications and equivalent arrangements included within the spirit and scope of the appended claims.

What is claimed is:

1. A component car system comprising a chassis and a plurality of modular body components mountable on said chassis or to each other to form a car body having the appearance of a classic car wherein said chassis comprises a central frame member comprising at least two long sides and a front end and a back end and farther comprising a front frame member extending from said front end and a rear frame member extending from said back end, said central frame member further comprising at least two mounting means for mounting body components, said front frame member further comprising at least two mounting means for mounting body components, said rear frame member further comprising at least two mounting means and a plurality of flanges for mounting an engine, said plurality of body components comprising a cab section, a rear end section, at least one pair of doors, a front end section, a front trunk box comprising a mating edge and flange extending therefrom said edge and flange extending around and forming an outside perimeter of said front trunk box, and a hood wherein said rear end section further comprises a rear trunk box integral with a right rear fender and a left rear fender, said right and left rear fenders forming the right and left rear sides and the rear of the car and rear wheel wells and further comprising air induction cutouts and at least one grille receiving opening, and wherein said cab section further comprises a body, a floor, door openings for receiving said doors, wheel well inside walls and a bulkhead, wherein said front end section further comprises right and left front fenders forming the right and left front sides, a fairing formed between said front fenders and forming a front of the front end section and front wheel wells and headlight apertures for receiving headlights, and wherein said rear end section, cab section, and front trunk box are mountable directly on said chassis, said cab section further comprises a firewall, said front trunk box further comprises at least one flange forming a means for securable attachment to said firewall, said rear end section is further securably attachable to said cab section, said front end section further comprises interior edges, said edges comprising interior flanges extending therefrom and said interior flanges are further securably attachable to the flange of said front trunk box, and said front trunk box and said hood is hingedly attachable to said front end section.

2. The invention according to claim 1 wherein said mounting means comprises an aperture for receiving at least one bolt.

3. The invention according to claim 1 further comprising at least two strut supports mounted on said front frame member.

4. The invention according to claim 1 further comprising at least two strut supports mounted on said rear frame member.

5. The invention according to claim 1 further comprising at least one cross member mounted on said front frame member.

6. The invention according to claim 1 wherein said doors further comprise a pair of front doors.

7. The invention according to claim 1 wherein said doors further comprise a pair of front doors and a pair of rear doors.

8. The invention according to claim 1 further comprising a front end support securably mountable on said front end section and wheel well covers.

9. The invention according to claim 1 further comprising a trunk cover mountable to said rear end section and wherein said at least one pair of doors is hingedly mountable on said cab section in a pair of openings formed on either side of said cab section.

10. The invention according to claim 1 further comprising a pair of air induction grilles securably mountable in said air induction cutouts and at least one rear grille securably mountable in said at least one grille receiving opening.

11. The invention according to claim 1 further comprising at least one glove box formed in at least one of said doors.

12. The invention according to claim 1 wherein said rear end section further comprises at least one flange for attaching said rear end section to said cab section.

13. The invention according to claim 1 further comprising front and rear windows and at least one engine mountable on either the front or rear frame member.

14. The invention according to claim 13 wherein said engine is mountable on said rear frame member, and further comprising a cooling system wherein said cooling system is a radiator, said rear end section further comprising a rear trunk box integral with a right rear fender and a left rear fender, said right and left rear fenders forming the right and left rear sides and the rear end of the rear end section and rear wheel wells and further comprising air induction cutouts and at least one grille receiving opening, said right and left rear fenders each having air ducts formed therein, said air induction cutouts forming one end of each of said ducts and each of said ducts terminating at an other end in said trunk box, said radiator is mountable in said rear trunk box proximate said grille receiving opening and said radiator is cooled by air flowing through said air ducts communicating with air induction cutouts formed on said rear fenders.

15. The invention according to claim 14 wherein said engine is mountable on said front frame member, said front frame member comprising a plurality of mounting means for mounting said engine, said component car system further comprises a front end support member mountable on the front of said front end section, wherein said radiator is mountable on the anterior of said front end section and posterior said front end support member.

16. The invention according to claim 1 further comprising a first engine mountable on said front frame member, said front frame member comprising a plurality of mounting means for mounting said first engine and a second engine mountable on said rear frame member, said rear frame member comprising a plurality of mounting means for mounting said second engine, said front and rear frame members comprising substantially identical structures.

17. The invention according to claim 1 wherein said chassis and cab section are extended to provide a limousine-type vehicle having the appearance of a classic car.

* * * * *